(12) United States Patent
Piersol

(10) Patent No.: US 8,788,830 B2
(45) Date of Patent: Jul. 22, 2014

(54) METHOD AND APPARATUS FOR LOGGING BASED IDENTIFICATION

(75) Inventor: Kurt Piersol, Campbell, CA (US)

(73) Assignee: Ricoh Co., Ltd., Tokyo (JP)

( * ) Notice: Subject to any disclaimer, the term of this patent is extended or adjusted under 35 U.S.C. 154(b) by 1439 days.

(21) Appl. No.: 12/244,721

(22) Filed: Oct. 2, 2008

(65) Prior Publication Data

US 2010/0088517 A1    Apr. 8, 2010

(51) Int. Cl.
| | |
|---|---|
| H04L 9/32 | (2006.01) |
| H04L 29/06 | (2006.01) |
| G06F 7/04 | (2006.01) |
| G06F 17/30 | (2006.01) |
| H04N 7/16 | (2011.01) |
| G06F 7/00 | (2006.01) |

(52) U.S. Cl.
CPC .............. *H04L 9/3223* (2013.01); *H04L 9/32* (2013.01); *H04L 9/3271* (2013.01)
USPC ............. 713/176; 713/155; 713/157; 726/30; 707/698

(58) Field of Classification Search
CPC ....... H04L 9/32; H04L 9/3223; H04L 9/3236; H04L 9/3271; H04L 2209/38
USPC ............................ 380/259, 262, 264; 726/30; 707/697–698; 705/75; 713/155–157, 713/168–177
See application file for complete search history.

(56) References Cited

U.S. PATENT DOCUMENTS

| | | | | |
|---|---|---|---|---|
| 5,978,475 | A | * | 11/1999 | Schneier et al. ............... 713/177 |
| 7,328,457 | B1 | * | 2/2008 | Mister .............................. 726/30 |
| 7,545,930 | B1 | * | 6/2009 | Shields ........................... 380/44 |
| 7,694,126 | B2 | * | 4/2010 | Miyazaki et al. ............. 713/150 |
| 7,996,675 | B2 | * | 8/2011 | Nikander ....................... 713/168 |
| 2006/0010095 | A1 | * | 1/2006 | Wolff et al. ........................ 707/1 |
| 2007/0106908 | A1 | * | 5/2007 | Miyazaki et al. ............. 713/189 |
| 2008/0104407 | A1 | * | 5/2008 | Horne et al. .................. 713/178 |
| 2008/0141365 | A1 | * | 6/2008 | Soegtrop .......................... 726/21 |

FOREIGN PATENT DOCUMENTS

WO    WO 01/46917 A2    6/2001

* cited by examiner

*Primary Examiner* — Linglan Edwards
*Assistant Examiner* — Daniel Potratz
(74) *Attorney, Agent, or Firm* — Blakely, Sokoloff, Taylor & Zafman LLP

(57) ABSTRACT

A method and apparatus for logging based identification are described. In one embodiment, the method comprises extracting entries of a hash chained log that represents a series of previous transactions. The method may also comprise ordering hash values of the entries extracted from the hash chained log into an ordered list. In one embodiment, the method may further comprise producing a cryptographic hash of the ordered list.

24 Claims, 10 Drawing Sheets

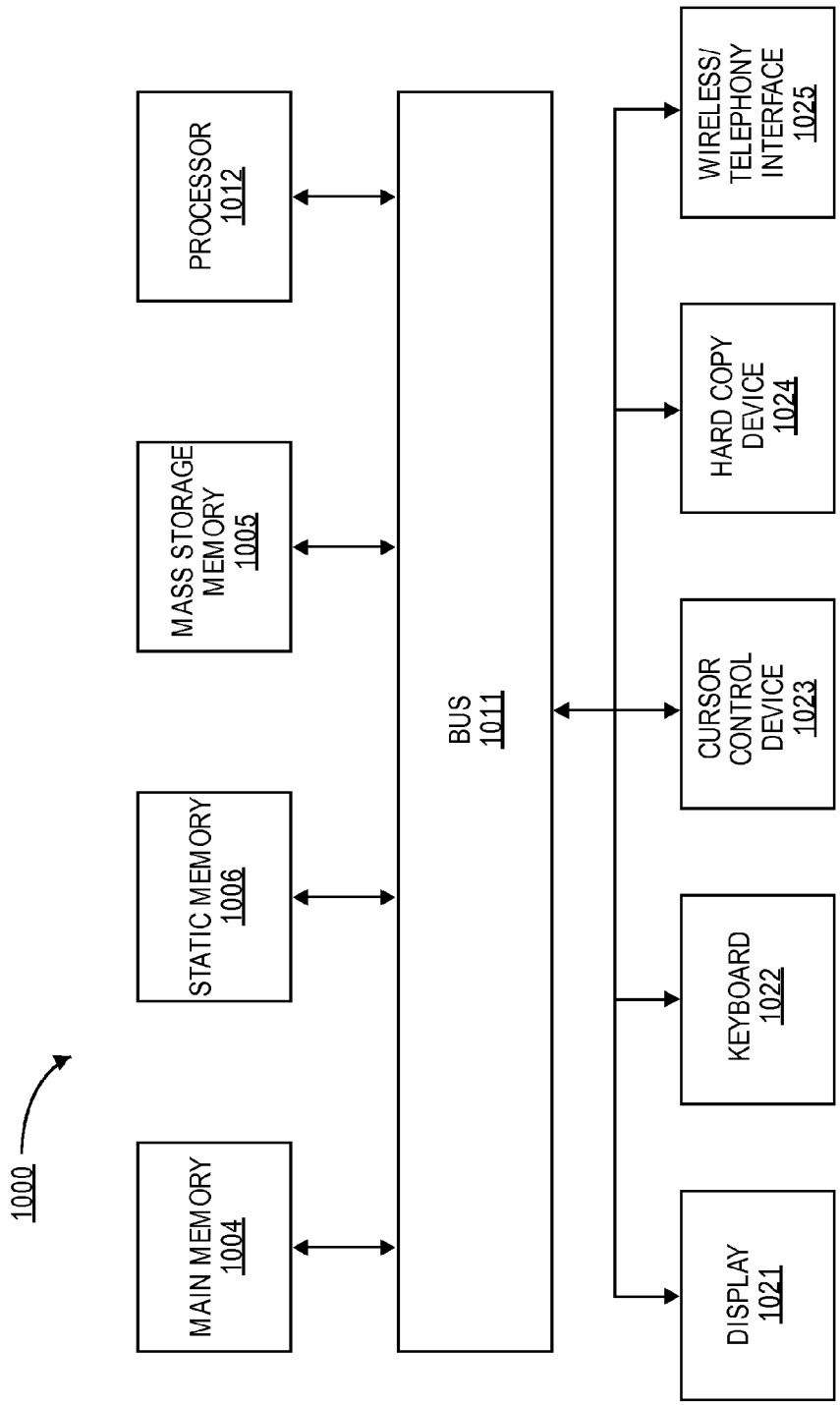

METHOD AND APPARATUS FOR LOGGING BASED IDENTIFICATION

FIELD OF THE INVENTION

The present invention relates to the field of digital object distribution; more particularly, the present invention relates to logging based identification.

BACKGROUND OF THE INVENTION

Millions of documents are sent back and forth every day. Substantial effort and time is spent in the overhead of addressing these documents. In the workplace, this substantial time and effort results in increased cost and expense.

Many document management systems have been proposed and implemented in the past. These document management systems include systems that store documents and handle the coordination of requests with responses. However, these systems do not cut across organizational boundaries and do not perform the synchronization that is necessary.

A log is a document management tool used to record information. Logs may use a client-server framework to permit the addition or subtraction of content from one or more client locations to a server that hosts the web log. Because one server hosts each log, web logs are typically anchored to a particular HTTP location.

Furthermore, identification of parties that exchange requests and responses, documents, etc. is increasingly important in the digital age. Parties must identify themselves, as well as respond to identification requests. Typically this communication is facilitated by shared public key encryption. However, static and pre-generated encryption keys may be hacked or stolen, thus allowing attackers to reveal, steal, and exploit secret information.

A reliable, shared history forms the basis for trust within communities. Standard processes such as encrypted transactions, double entry accounting, and paper trails provide traceability and support for auditing. Independent verification of these records is critical to the functional of all communities and institutions, from local clinics and self-help groups to global stock exchanges.

SUMMARY OF THE INVENTION

A method and apparatus for logging based identification are described. In one embodiment, the method comprises extracting entries of a hash chained log that represents a series of previous transactions. The method may also comprise ordering hash values of the entries extracted from the hash chained log into an ordered list. In one embodiment, the method may further comprise producing a cryptographic hash of the ordered list

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 10 is a block diagram of a computer system that may perform one or more of the operations described herein.

DETAILED DESCRIPTION OF THE PRESENT INVENTION

Figure 1:
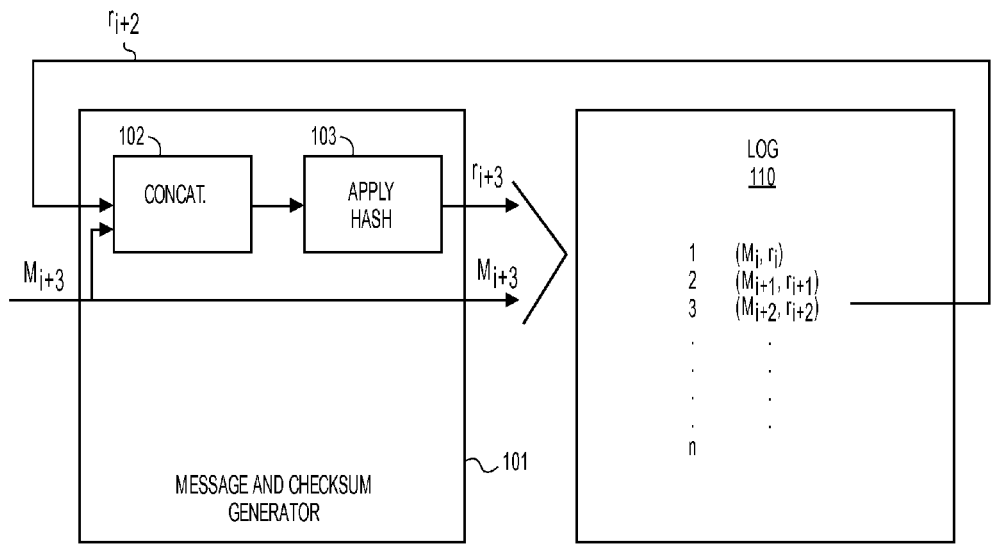
FIG. 1 illustrates generating and storing an entry in a log.

A method, apparatus, and article of manufacture for logging based identification are described. In one embodiment, entries of a hash chained log, where the log represents a serious of previous transactions between parties, is extracted. Hash values of the extracted entries are then ordered into an ordered list. In one embodiment, the order is the order in which the corresponding records appear in the hash chained log. A cryptographic hash is then produced from the ordered list.

In one embodiment, ordering hash values further includes receiving a set of hash values from a sending system, where the set includes actual hash values (i.e., hash values that correspond to log entries) randomly intermixed with false hash values (i.e., hash values that do not correspond to log entries). The false hash values are removed from the set as part of the ordering process so that the produced cryptographic hash is computed from the ordered and actual hash values.

In one embodiment, as discussed in greater detail below the properties of hash chained log, shared transaction histories, and hash functions are utilized to answer challenges of a sending system, assert one's identity, encrypt data, etc. The nature of the hash values, being seemingly randomly distributed bit strings of anywhere from, for example, 128 bits to 512 bits or more, ensures that an outside attacker will virtually be guaranteed to fail at distinguishing false hash values from actual hash values corresponding to log record entries. In the extremely unlikely event that an attacker does distinguish false and actual hash values, the additional hurdle of organizing the actual hash values into a proper order is also required.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Media Identifiers, Sequential Logs, and Entangling Media Identifiers for Electronic Items Many of the embodiments described herein require the ability to refer to a document, video, song, an image of a piece of paper, electronic file, etc. by an identifier. For purposes herein, the document, video, song, piece of paper, electronic file, etc. are referred herein to as the media. An identifier used to identify the media is called a media identifier and, in one embodiment, is a string of bytes.

In one embodiment, there are several properties of the association between the media and the media identifier which are useful in the embodiments described herein: a) it is beneficial that anyone who has the media can determine an identical media identifier; b) it is beneficial that it is difficult for anyone to find two distinct pieces of media that have the same media identifier; c) it is beneficial that the media identifier does not reveal anything about the content of the media; and d) it is beneficial that any change to the media would result in a different identifier.

There are multiple ways to assign an identifier to a piece of media. For an electronic file, in one embodiment, the identifier is generated by applying a cryptographic hash function to the bytes of the file. Cryptographic hash functions are well known in the communications and security literature and have been standardized in various federal and international standards, and software toolkits.

Cryptographic hash functions meet the properties described above so well that the process of determining an identifier for a piece of media is sometimes referred to as "hashing" and the media identifier is at times referred to as a "hash," even if a different technique is used to determine the identifier. We refer to a media identifier computed with a cryptographic hash as a Content Based Identifier, or CBI. In one embodiment, a Content Based Identifier includes a prefix as well as the hash. In one embodiment, the prefix is used to identify the function used to compute the hash, e.g., "sha1" for the Secure Hash Algorithm SHA-1 hash function.

There are other ways to assign identifiers to files. For example, a server could keep a copy of every file and assign a previously unused string randomly to each new file. This method works very well for properties b, c, and d, but only meets property a if everyone can contact the server, and the server cannot be changed, even if taken off-line by, for example, by a denial of service attack.

It is also possible to use functions that are simpler than cryptographic hashes to identify files. For example, a simple checksum can be used on a file, and the result used as a media identifier. This meets properties a and c, but not property b. While most changes to a file will result in a different simple checksum, the simplicity of the checksum means it is easy to come up with a set of strings that can be added to a file without changing the checksum. Therefore property d is not well met by the simple checksum. For some applications these properties may be less important. Also some applications may have very structured data, such that it is difficult to find two pieces of media that both have the same checksum and follow the rules of the structured data. Thus, in one embodiment, a content based identifier is not a cryptographic hash.

In one embodiment, physical pieces of paper are assigned an identifier, for example, by scanning the paper and computing a cryptographic hash of the scanned file that results. However, because of noise in the scanning process, different scans of the paper normally lead to different electronic files, and thus different identifiers. For this reason, it is sometimes convenient to affix a barcode or other machine readable identifier (e.g., a RFID tag) to a piece of paper or other physical device. Use of a machine readable ID makes it easy for anyone to determine the same identifier from different copies of a document for example; however, it is also possible to attach the same ID value to different media, so properties b and d are not well met in this case.

In one embodiment, to overcome the weakness of machine readable ID's, a form of "finger printing" is used to identify physical media. Since finger printing associates values with the physical device, it can be very hard or impossible to make a new "finger" or piece of paper with the same finger print. However, in many cases, the "finger print" reveals something about the physical media, also it may be possible to change the physical media slightly without changing the finger print. Thus, in such a case, properties c and d might not be held perfectly.

In one embodiment, multiple identifiers are associated with a single piece of media. For example, there could be an identifier formed by using the SHA 1 cryptographic hash function on the media, and an identifier formed by using the SHA256 or MD5 cryptographic hashes on the same media. In one embodiment, keyed-hash message authentication codes or HMAC are used to compute media identifiers. These message authentication codes like HMAC-MD5 or HMAC-SHA1 can be better than the underlying cryptographic hash functions (MD5 and SHA1) for properties B, C, and D because they use a key which can change. However, property A is more difficult with message authentication codes because in order to compute the same hash, all places computing it must have access to the key.

In one embodiment, different identifiers are associated with different formats of the same data. For example, the hash of a file and the hash of the ".zip" file obtained by lossless compression of the file, are different identifiers, but they are associated with the same final data.

In one embodiment, identifiers are formed for part of the media. For example, in the case of video, there could be an identifier formed for each different frame. Because of packet loss in a network, two people watching the same video might not end up with the same file, and thus they would be unable to compute the same identifier. However, each person would receive several identical frames of the video. So if they computed a hash of each frame they received, they could determine that they were watching the same video because of the large number of identical hashes.

To continue the same example, two people watching the same video might watch it at different resolutions; in this case, no two frames will have the same hash. However, if the video was stored in a scalable method, e.g. JPEG 2000 part 3, then the lowest resolution portion of the video may be the same for both viewers, and common hashes could be determined.

When video is not stored in a scalable format, a server typically stores multiple versions of a video at different resolutions. The server can thus compute a hash of all frames of all resolutions it has stored, and thus any frame received completely by a client can be hashed and the hashes later compared with those on the server to identify the video.

In addition to video, there are other types of media that may be partially transmitted. Portions of document images in PDF, JPM, or JPEG 2000 can be transmitted with a variety of resolutions, qualities, or sets of pages. XML documents may also be partially transmitted. For example, part of a large XML document may be requested. The request may be, for example, by an XPATH query. The portion of the document received by the client is different from the whole document available at the server. However, it is possible to compute hashes for portions of the documents (e.g., subtrees of the XML document) or even contents of particular nodes in the XML document. A client with a subset of the XML document can compute hashes on the subtrees and nodes that it receives, and these can be matched against a large list of hashes at the server.

For any particular media, relevant subsets of the data can often be determined and these subsets can be hashed in addition to the hash of the complete media.

In some cases, the data is processed so that the portion delivered does not actually appear in the data as a whole. For example, a color image might be converted to grayscale and then delivered, or the sum of entries in a spreadsheet might be computed and reported. However, if the data exists at two places (e.g. the server and client), then even if only modified data is delivered, it is possible for both server and client to record hashes of the modified data and the association between the received data and its source can be made at a later time.

In some cases, the "server" might not have the modified data initially. For example, if an intermediate processing device performs the computation on the data. However, if the type of computation is known, it could be later run on the server to associate the original media with the received data. For example, a server might send a high bit rate video, but due to network congestion, the video may be truncated by removing a quality layer at an intermediate router. A client thus receives a medium bit-rate video that can be hashed. In order to determine the same hashes, the server runs the hash on the high rate video without the quality layer that the router discarded.

Sequential Logs

Many of the embodiments described herein involve recording a sequence of events. The record of events is referred to as a "log" or "log-file," similar to the relationship with a log book used to record the events of a truck, ship, or aircraft, and the log files used to record the actions taken on computer systems. In one embodiment, the logs have a property that it is easy to add a new record to the end, but difficult to change a record already in the log without such a change being easily detected.

Unlike a traditional "log book" or "log file", in one embodiment, it is desirable for the log not to disclose much information about the event being recorded. In this way, the log file may be made available to a large number of people or systems so that some records can be checked, but the content of most of the records can remain secret.

There are several possible implementations of a log which have different levels of performance with respect to the goals of easy to add, hard to change, and partial disclosure of information.

A conceptually simple way to implement a log is a tamper-proof write once memory. Each record is written in order into the memory. This meets the goal of easy to add and hard to modify, but it is difficult to remotely verify that the "tamper-proof" memory has not been changed.

One method of implementing a log is to create a sequence of records where each record is made up of a message, $M_i$, and a rolling checksum, $r_i$. The rolling checksum is so named because it is computed from the current message and the previous checksum, and thus changes with each record. The rolling hash for the ith record can be computed as:

$$r_i = \text{hash}(r_{i-1} \cdot M_i)$$

where the message and the previous checksum are concatenated (represented by the ".") and provided to the hash function. The log in this case consists of a sequence of messages and checksums ($M_i$, $r_i$). In one embodiment, an addition to the log may be made by taking the last checksum and the current message, concatenating the two, and computing the hash. This is shown in FIG. 1. Referring to FIG. 1, to create a new message and checksum pair, a message and checksum generator 101 receives a new message, $M_{i+3}$ and the checksum $r_{i+2}$ of the last entry in log 110. A concatenation module 102 concatenates the previous checksum $r_{i+2}$ with the message $M_{i+3}$. Hash module 103 applies a hash function, as described herein, to produce the next checksum $r_{i+3}$. Message $M_{i+3}$ and checksum $r_{i+3}$ are then stored in log 110. Note that message and checksum generator 101 may comprise a processing unit (e.g., a microprocessor) with concatenation module 102 and hash unit 103 being software modules of instructions that are executed by the processing unit. Alternatively, these functions could be implemented in hardware.

If one of the messages in the log is modified, or one of the checksums in the log is modified, then with high probability the subsequent checksum value recorded in the log will not correspond to the hash of the message and previous checksum. Thus modifying a record in a manner that cannot be detected would require changing the message and recomputing all subsequent checksums. If one of the checksums is copied and stored elsewhere, then any modification prior to that checksum can be detected. If a modification is made without updating the checksums, then recomputing the rolling checksums or hashes in the log reveals the error. If the rolling checksums are all changed so the log is self consistent, then the modified checksums won't match the previously externally saved checksums.

As set forth above, the hash function could be a simple checksum, but preferably is a cryptographic hash function.

This method of creating a log meets most of the goals for the log, but there are variations which provide additional benefits.

One modification is to store the hash of the message rather than the message itself in the log. Thus, if $m_i$ is defined as:

$$m_i = \text{hash}(M_i),$$

then a log can be defined as a sequence of $(m_i, r_i)$, with $r_i$ being a checksum of only the message hash and the previous checksum:

$$r_i = \text{hash}(r_{i-1} \cdot m_i).$$

Figure 2:
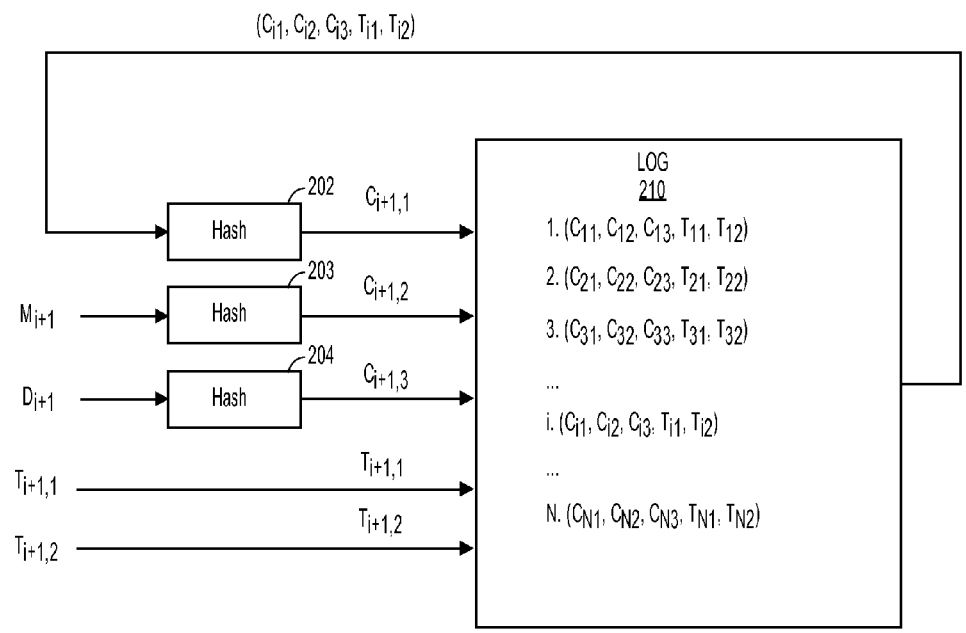
FIG. 2 illustrates generating and storing a hash of media in a log.

Another embodiment of a log is shown in FIG. 2. Referring to FIG. 2, to generate the i+1st log entry, the ith entry from log 210 is fed back to hash generator 202. Hash generator 202 utilizes a hash function to produce a Content Based Identifier, $C_{i+1,2}$ which becomes part of the new log entry. Several messages or message hashes may be added to the log at the same time. In FIG. 2 there are 4 messages shown, each of which could be a media file, metadata item, a CBI from another log, or string of bytes of any sort. Two of the messages, $M_{i+1}$ and $D_{i+1}$ are separately hashed by hash generators 203 and 204 to produce $C_{i+1,2}$ and $C_{i+1,3}$ which become part of the new log entry. Finally, messages $T_{i+1,1}$ and $T_{i+1,2}$ are stored directly in the log without hashing. A variable number of hashed messages and unhashed messages may be included. Some logs may not use any unhashed messages, or always use the same number of hashed and unhashed messages, or the unhashed messages may be of a fixed length or format to allow for easy parsing.

Storing the hash of a message rather than the message in the log has the advantage of producing fixed length records provided that the hash function has a fixed length, which is commonly true. This method has the further advantage of not having any message content in the log. Thus, if the message was some customer information (e.g., a purchase order with name, address, and order information), it would not be desirable to publish the message. However, if the hash used does not reveal information about the message, then the entire sequence of $(m_i, r_i)$ i.e. the log, can be published without revealing the sensitive customer information.

In some embodiments, more than one message $M_i, M_j, M_k$, etc. might be appended to the log as a single atomic transaction. A single hash function can be applied to the entire record with the message hashes arranged in a chosen order, producing the checksum $r_i$.

In one embodiment, the record and rolling checksum are structured slightly differently. In this case, each entry in the log is considered as a piece of media, and a cryptographic hash based identifier for the previous media is stored in the log along with the hash of the current message. Thus, a log consists of a sequence of $(p_i, m_i)$ where $mi = \text{hash}(M_i)$, and $p_i = \text{hash}(p_{i-1}, m_{i-1})$.

In some cases, it is desirable to have a log with more information than solely the hash of the message. For example, it is often useful to have the time stored in the log or the type of information of the log entry stored in the published log. This makes it easier to search the log for specific records. Thus, then in one embodiment, if the information in a record that is readable is defined as the "plain text", called $t_i$, the log consists of a sequence of $(t_i, m_i, r_i)$, and each checksum, $r_i$, is computed as:

$$r_i = \text{hash}(r_{i-1} \cdot t_i \cdot m_i)$$

This format is quite general because the $t_i$ portion could contain further structure (e.g., always a date and a type and a file name) while the messages could also be structured. Of course, the order of the previous rolling checksum, the current message or message hash, and "plain text" information can be changed, as long as the order is known to all applications needing to generate or verify a checksum.

Another way to provide partial access to information in a log is to encrypt some of the information stored in the log. Suppose the encrypted information for a log is $E_i$, and the hash of $E_i$ is $e_i$. In one embodiment, either $E_i$ or $e_i$ can be stored in the log. Thus, a log entry might consist of $(t_i, m_i, E_i, r_i)$, i.e. a plain text portion, a hash of the message, some encrypted data and a hash of the previous hash in the log and concatenated with the hash of the message. In general, there could be a mix of times and a record might have several plain text portions, several encrypted portions, and several hashes of messages.

In one embodiment, the format for log entries is a set of header "lines" and a body with data, e.g.

In one embodiment, this type of format is used for http and email. Thus, several well-known headers have already been defined for those applications and could be used in a log.

Different keys can be used for different encrypted entries or different types of encrypted entries in the log. For example, all log entry publication information might be encrypted with one key, all classification values with a different key. If the log is associated with a single document and that document is encrypted, then the entries in the log might be encrypted with the same key as used for the document. That way, anyone with access to the document is also granted access to the information in the log.

Another method of implementing logs is through content based identifiers (CBIs). In one embodiment, a CBI is a sequence of bytes computed as a one way hash of a piece of media, representing a document, image, scanned piece of paper, etc. The CBI consists of two parts, a hash type used to compute the hash value and the hash value itself. In one embodiment, the hash type is defined by a five byte string indicating a hash type of md5, sha1, sha256, or Null, though other types of hashes may be utilized.

Log entries are made up of two or more CBIs, where the first CBI is either an initialization value or a reference to a previous log entry. The second and subsequent CBIs are content, such as other log entries, data, arbitrary strings of bytes, etc. An exemplary grammar for a log entry is:

--- entry = prev-ref 1*("-" content-ref)
prev-ref = cbi
content-ref = cbi
cbi = md5cbi | sha1cbi | sha256cbi | nullcbi
sha1cbi = "sha1." 40LOWHEX

```
md5cbi     = "md5x." 32LOWHEX
sha256cbi  = "s256." 64LOWHEX
nullcbi    = "null."
LOWHEX     = "a" | "b" | "c" | "d" | "e" | "f" | DIGIT
DIGIT      = <any US-ASCII digit "0".."9">
entry-line = "Entry:" SP entry CRLF
CRLF       = CR LF
CR         = <US-ASCII CR, carriage return (13)>
LF         = <US-ASCII LF, linefeed (10)>
log-chain  = *entry-line
```

An entry line is utilized to store CBI log entries in a text file, or other string based data structure, and a log chain is a sequence of log entries where every entry beyond the first contains the hash of the previous entry. Thus, in one embodiment, a sequence of syntactically correct log entries where any entry other than the last does not contain the correct hash of the previous log entry is an invalid log chain. One embodiment of verification of a log chain is described in greater detail below. An exemplary log chain is:

```
Entry: null.-sha1.a72bfa0145c55eeb34400fa28489d3023dcb34e4
Entry: sha1.940f74e519e28fb9e5578291339251aea295fa2d-
sha1.a9993e364706816aba3e25717850c26c9cd0d89d
Entry: sha1.91f09dd09691e697cc5d9dba7515bc1a92177fa4-
sha1.84983e441c3bd26ebaae4aa1f95129e5e54670f1
```

The exemplary log chain file above includes three complete log entries. While log entries may be stored in a file, in one embodiment, log entries are also stored as records in a database. For example, a shared document scanner is connected to a network, scanned documents are created as PDF files on the scanner, and distributed somewhere on the network, depending on user input. The scanner keeps track of where documents are initially distributed, and the date of capture and the cryptographic hash of the PDF file containing the scan. The scanner does not store the contents of all files (scans), but does store the hash of all files. In one embodiment, the scanner stores log chains with verification data about the scans in a database, such as an SQL database table. In another embodiment, the log chain provides verification information about the scans and the records in database tables. Although the example above discussed a scanner utilizing log chains, mail servers, multi-function printers, etc. may also be configured to create and log CBI entries.

In one embodiment, as discussed above, a log supports different multiple rolling hashes or different types of hashes, i.e. hashes computed with different cryptographic hash functions. For example, in one embodiment, the value $r_i$ is as follows:

$$r_i = \text{hash}(r_{i-1}, t_i, m_i)$$

and the value of $t_i$ specifies which hash function was used (e.g., MD5, SHA1, SHA256, etc.). In one embodiment, a log entry with two different rolling checksums has entries like:

$$(t_i, m_i, r_i, s_i)$$

where $r_i$ is computed as:

$$r_i = \text{SHA1}(r_{i-1}, t_i, m_i)$$

and $s_i$ is computed as:

$$s_i = \text{SHA256}(s_{i-1}, t_i, m_i)$$

As with the single rolling checksum case, the sequence of $r_i$ and $s_i$ can started by setting $r_0$ and $s_0$ to a preset initialization value, or to the hash of some media. This allows the same log to be used with systems that only support one type of hash, and if one hash function is broken, the other hash function may still be valid, and the combination of both is likely to be even harder to break. Other arrangements with logs using two or more hash functions would be apparent to those skilled in the art.

It should be noted that log entries can be added which retrospectively add new hash chains to a log. Suppose a log consists of pairs of messages and rolling hashes $(M_i, r_i)$, with $r_i = \text{SHA1}(r_{i-1}, Mi)$, with i between 1 and N. New messages can be added to the log which consists of the old messages and a new rolling hash computed with a different hash function. Thus, message N+1 could be the first message concatenated with a rolling checksum computed using a new hash function. In general:

$$M_{N+1} = M_i \cdot s_i$$

where $$s_i = \text{SHA256}(s_{i-1}, M_i)$$

This allows the later repair of logs whose hash functions have been compromised, by adding a new hash covering the same material. Any number of hash functions can be applied retrospectively in this fashion, as hash functions are compromised and new functions are discovered.

In one embodiment, a second hash function makes use of the first hash function in its computation. For example, $$s_i = \text{SHA256}(s_{i-1} \cdot t_i \cdot m_i \cdot r_i)$$

or $$s_i = \text{SHA256}(r_{i-1} \cdot s_i \cdot t_i \cdot m_i)$$

Storage for a Log

In one embodiment, a log is stored sequentially in a single file. This sort of log is very easy to create because the rolling hash from the last entry is read, and new data is appended to the end of the file. If the entries are fixed length, it is easy to find a specific entry in the file. In many cases, a single file is sufficient especially if the log does not have too many entries.

In some cases, the log may become very long, usually because a record of a frequent event is being made. If a log is used to accumulate data from multiple sources, there could be several entries per second. In this case, it may be useful to break a log into multiple files, for example, after every 10,000 entries.

In another embodiment, each log entry is stored in a separate file. In this case, a pointer to the most recent entry is used for fast access. In one embodiment, the record has a sequence number inside it, and the most recent record can be determined by examining all record numbers. One technique is to name the file with the rolling hash, and include the rolling hash of the previous record in the file. In this way, it is possible to go from the most recent entry back through all the entries by following the pointer.

In another embodiment, each log entry is a record in a database. This is quite useful to enable rapid search for a particular message hash, rolling hash, range of times, plain text, or whatever the rest of the content of the log entry contains. A database implementation is useful when large numbers of entries are being made in the log because databases provide transactional integrity.

Write Once Memory

In addition to the computational methods of insuring that events occur in sequence, in one embodiment, a physical tamper proof device may be used to store a sequence of events. In one embodiment, the physical tamper proof device is a write once memory that stores the hashes of messages in order. Changing the entries in this sort of log would require changing the memory.

While write once memory is simple, it is hard to verify remotely that it hasn't been tampered with. Thus, in one embodiment, a tamper proof system provides digital signatures or other authentication techniques for its content.

Publishing Log Entries

Because it is relatively easy to modify a single log in a manner that is not detectable upon examination of that log in isolation, in one embodiment, information is exchanged between logs in such a way that modification of the entries in one log can be detected by examining another log. It is important to store information in the second log that depends on a range of log entries in the first log. For the logs defined previously, the rolling checksum has that property. Each checksum depends on the previous checksum and the other data in the log entry. Thus, if any part of a log entry is changed, the rolling checksum changes, and the rolling checksums after that point also change. Regardless of the computation function used for the "hash," if the messages or records contain more bits than the hash, there exist multiple messages or records that have the same hash. However, if the function used for the rolling checksums are well chosen, e.g. a cryptographic hash function, it is extremely difficult to find these messages.

There are several ways to store information from one log in another log. This process is called publishing or entangling because after storing information from one log in another, all future rolling checksums in the second log depend on the information in the first log.

In one embodiment, one log is being used to store pairs of message hashes and rolling hashes, i.e. $(m_i, r_i)$, and the rolling hash from the first log is used as the message hash for an entry in a second log. Thus, all rolling hashes after that entry in the second log depend on the rolling hash from the first log.

While this is the simplest embodiment, the limited amount of information stored when publishing can make it difficult to determine what the nature of the hash is. Thus, in one embodiment, additional information is included in the log entry used for publication. For example, those logs using a type value can set the type to indicate that the data is not a "regular message" but an "external checksum." Further, instead of using a rolling checksum directly in place of the message hash, a message can be formed which contains the rolling hash from the first log and the location of the first log (e.g., a server name, a log name, a file name, URL, etc.). In one embodiment, the location of the rolling hash in the first log is included (e.g. a sequence number, date, etc.). This embodiment allows a log to be followed backwards and allows determination of the other logs on which the current log depends.

Figure 3:
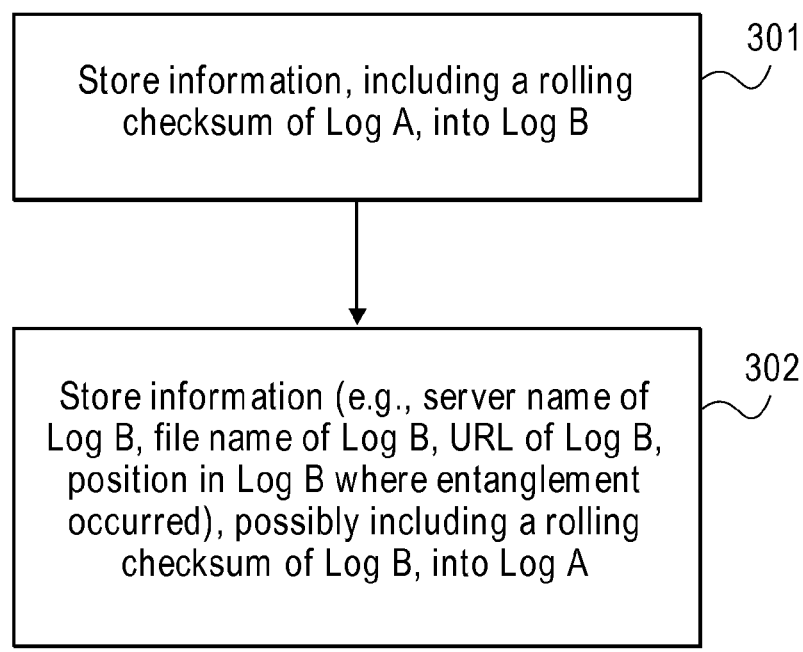
FIG. 3 is a flow diagram of one embodiment of a process for entangling a pair of logs.

In many cases, it is desirable to determine which logs contain information from a first log. In order to facilitate this, information can be stored in both logs when checksums are published. FIG. 3 is a flow diagram of one embodiment of a process for publishing or entangling a pair of logs. The process is performed by processing logic that may comprise hardware (circuitry, dedicated logic, etc.), software (such as is run on a general purpose computer system or a dedicated machine), or a combination of both.

Referring to FIG. 3, the process begins by processing logic storing information, including the current rolling checksum of log A into a log entry in log B (processing block 301).

Next, processing logic stores information about log B in log A (processing block 302). In one embodiment, the information stored in log A about log B may include the server name, file name, or URL of log B and the position in the log where the entanglement is stored. In one embodiment, the information stored in log A may also include a rolling checksum from log B. If this checksum is stored in the log, the publication is both from log B to log A and from log A to log B.

Verification Procedure

In many situations, it is necessary to determine if a log has been modified since it was created. This is best done by software, computer systems, and people independent from the log generation hardware, software, and people.

In one embodiment, to determine if a log is self consistent, verification software such as in a computer system of FIG. 10 or a dedicated machine recomputes the rolling hash for each entry in the log. If the rolling hash computed by the verification software matches the rolling hash stored in the log, then the entry associated with the rolling hash has not been changed unless the hash function has been compromised. For purposes herein, the hash function "being compromised" means two distinct sequences of bytes have been found that yield the same hash.

To determine if entries in a log are consistent across multiple logs, the entries must be consistent from the message of interest up to and including a rolling checksum that is published in or entangled with another log. The entries in the second log must be self consistent before and after the published entry. If Log A has entries which are published to Log B, Log A and Log B may be referred to as being entangled.

An Example of a Hash Chain Detection Procedure

Figure 4:
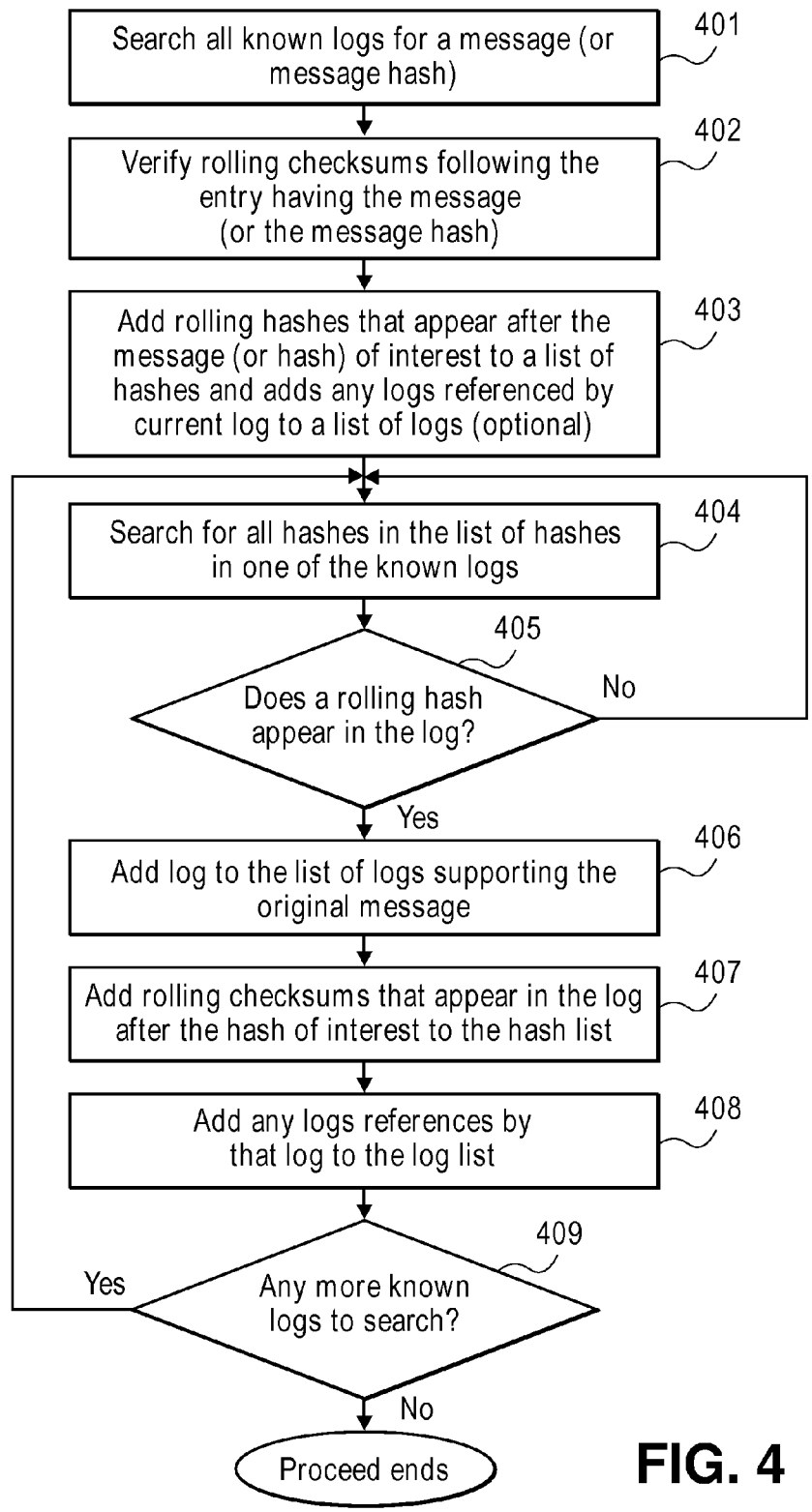
FIG. 4 is a flow diagram of one embodiment of a process for performing entanglement detection.

If a third party wishes to determine the validity of a message stored in a log some time after the entry was made and rolling checksums were published to other logs, hash chain detection allows all servers which have entries that are consistent with the message to be determined. FIG. 4 is a flow diagram of one embodiment of a process for performing entry verification. The process is performed by processing logic that may comprise hardware (circuitry, dedicated logic, etc.), software (such as is run on a general purpose computer system or a dedicated machine), or a combination of both.

Referring to FIG. 4, the process begins by processing logic initializing a list of servers that have evidence to the empty set, initializing the list of messages or hashes of interest to the single message or hash desired and searching for the message or message hash of interest on all known logs (processing block 401). If the message or its hash is not found anywhere, no verification is possible and the process ends.

If a message or hash of interest is found, then the processing logic verifies the rolling checksums following the entry containing the message or hash, for every log where the message or message hash is found (processing block 402). In one embodiment, this is done by recomputing the checksums $r_i$ for the log using the verification software.

Processing logic adds all rolling hashes that appear after the hash of interest to a list of hashes, and adds any logs referenced by the current log to a list of logs of interest (processing block 403). Some logs will not list other logs, in which case there is nothing to perform for this sub-step.

Processing logic searches for all hashes in the hashes of interest list in one of the known logs that has not been searched (processing block 404). Afterwards, processing logic tests whether a rolling hash appears in the log (processing block 405). If not, the process transitions to processing block 404 where the process continues. If a rolling hash appears in a log, processing logic adds that log to the list of logs with evidence about the original message or hash (processing block 406), and adds all rolling checksums that appear in the log after the hash of interest to the hash list (processing block 407) and adds any logs referenced by that log to the log list (processing block 408).

Processing logic then checks whether there are any more known logs to search (processing block 409). If not, the process ends. If so, processing transitions to processing block 404 and repeats the process until no new hashes are added to the list of hashes of interest, and no new logs are added to the list logs.

In general, many logs may be stored on the same device, same office, or same company. However, if a log is entangled with logs on multiple physical devices, or with logs which are under the control of different companies, then confidence in verification of the logs will be increased, because some of the logs used for verification are outside the control of the initial entity. This benefit of publishing to different devices means that the logs should be able to store addresses of entangled logs that cross company and device boundaries. One way to do this is to use a URL to identify a log.

In general, the technique described above to verify logs can involve a lot of operations. However, the complexity can be reduced by keeping better track of hashes and logs that have been previously searched. Complexity can also be reduced by only considering log entries occurring before a certain time, or searching certain logs first, for example if it is known that certain logs are used for entangling more often these can be searched earlier. Other search procedures can be used, for example, starting the search with a trusted server and looking for entries that have been published to that server.

Authentication Via Logs

The rolling checksum in a log can be used as part of an authentication mechanism. For example, knowledge of the most recent rolling checksum $r_N$ could be used as permission to write an additional entry to a log. A device keeping a log could insist that the most recent checksum be provided with the new log entry. By doing so, if two other devices know the current checksum, and both request to write to the log, only one will succeed. The first device to provide a new log entry will cause the checksum to change, and then the second device will not have the correct checksum. This technique provides a way to insure that new data is added to the log only if the provider of the data has the most up-to-date information about the log. Thus, the checksum can be used as a form of "lock" on the log to prevent race conditions.

The above discusses using the rolling checksum to control access to the log, but the rolling checksum can also be used to prove that the same log is being used again. In this case, the full contents of the log should not be publicly available. Someone could make a first interaction with a system using a log, and store a message in that log, and provide the rolling hash to the system. In a subsequent interaction, the system could ask for the rolling hash used to make the deposit. If more security is desired, in one embodiment, the system asks for information about that rolling hash (e.g., the hash of that rolling hash and a challenge string). The system could ask for several pieces of information about a previous interaction that could only be answered by someone in possession of the log.

In one embodiment, the term 'rolling checksum' is used herein to mean a string of bytes computed by a function, such as a cryptographic hash, on previous portions of a log. The portions of the log used in the computation vary from application to application. In one embodiment, a Content Based Identifier, or CBI, is used in the same way when the CBI is computed for a portion of a log, or computed for media (e.g., a digital photograph) that is not part of a log. In one embodiment, a hash chain is used to refer to a sequence of entries where each entry contains a rolling checksum, and all of the data in the hash chain before the final rolling checksum is part of at least one of the rolling checksums.

In one embodiment, verifying a rolling check sum or CBI includes operating the function used for the rolling checksum or CBI on the appropriate data, and comparing the computed result with the stored value. If the computed value and the stored value are the same, the rolling checksum is valid, consistent, verified, etc. In one embodiment, verifying a hash chain is used to mean verifying a sequence of rolling checksums or CBIs in the hash chain and comparing the computed results with the values stored in the hash chain. In one embodiment, a hash chain, where all of these computations produce results equivalent to the values stored in the hash chain, is said to be consistent. A consistent hash chain where the final entry is stored by a trusted entity is said to be verified. Furthermore, a hash chain where even one computation fails to produce the value stored in the hash chain is said to fail verification, be inconsistent, or be invalid.

In one embodiment, a hash chain begins with an item of media, and then a sequence of log entries. In this case, the CBI for the media must be in the first entry in the hash chain. Thus, verification includes computing the CBI for the media and comparing the computed value with the value in the first entry. In one embodiment, an item of media is verified by having a hash chain beginning with the media and ending at a log entry from a trusted entity. A properly formed log is a hash chain. In one embodiment, a log is a local collection of log entries with each rolling checksum in the same position in the entry.

In one embodiment, hash chains may be created from log entries stored in multiple locations and part of multiple logs. Logs may be created for a variety of reasons. In one embodiment, when a log contains information associated with a particular media, it may be referred to as a document log. In one embodiment, when a log is associated with a process, server, or collection of media, it may be referred to as a device log. The terms device log and document log may be used to imply typical usage, but do not limit the application to only one type of information.

Logging Based Identification

The problem of identification and authentication is a longstanding issue. In one embodiment, an identity in the electronic world may conceptually be considered a record of a series of transactions. Hash chained logging, as discussed herein, provides transaction records that are immutable, unforgeable, and occur in a specific time ordered sequence. Furthermore, in one embodiment, if both parties are involved in exchanging transactions and both parties maintain corresponding hash chained logs representing their prior history of transactions, then both have transaction records that may be used for determination or verification of identity.

In one embodiment, a number of prior transactions that form a transaction history are utilized for a secure and unforgeable system of identification. In one embodiment, transactions contain at least hashes of content data (e.g., text, image, audio, video, etc. data) and data representing a prior transaction. In one embodiment, the content data is sufficiently unique so as to be hard to guess individually. In one embodiment, for some time prior to authentication, a party who is testing another party's identification (i.e., the testing party) and the party who's identity is being tested (i.e., the tested party) exchange transactions and thus form a history of prior transaction records. In one embodiment, a transaction record is a triplet <p,i,t>, where p is the hash of a previous transaction record, i is an unique identifier for the party writing the transaction, and t is the transaction contents. For example, a bank and a customer might exchange requests for deposits, withdrawals, and balance checks, a portable media player and a media service may exchange requests for downloads, software updates, password exchanges, a mail client may exchange email with a secure server; a cellular telephone may request and respond to service and subscription offers from a cellular phone provider; etc.

In one embodiment, a party can write a transaction to another party, device, or system, by identifying itself to the other party, device, or system via an unique identifier, and giving a set of content bits of data. In one embodiment, if desired, the receiving party can request that the sender prove its identity using the identity test discussed below.

In one embodiment, authentication (e.g., identity proofs, identity assertions, encryption key generation, etc.) is based on the properties of the hash chained logs, cryptographic hashes, and a shared history of ordered transactions. As discussed herein, using the techniques described herein, an authenticating party is able to answer a challenge based on previous transactions, while an attacker finds the task almost impossible. The result is a robust and secure system of identification.

In one embodiment, the tested party receives a set of hash values, which include a random mix of false hash values and hash values that correspond to actual transaction records for transactions between the parties. In order to authenticate itself, in embodiments discussed herein, the tested party removes the false hash values from the hash values identified in actual transaction records between the parties. The remaining actual hash values may then be arranged into their proper order. In one embodiment, the proper order corresponds to the transaction order in which the hash values occur in the logs of the respective parties. In another embodiment, the proper order is an order previously agreed upon by the parties (e.g., the reverse order, a predetermined mix generated by pseudo-random number generator with known seed, etc.). The task of identifying and arranging the transactions by the tested party should be easily accomplished given the tested party's knowledge of the prior transactions. However, an outside party should find this task virtually impossible. In one embodiment, a cryptographic hash of the properly ordered hash values is then computed. In one embodiment, the tested party may be authenticated based on results of the cryptographic hash, as discussed in greater detail below.

Identity Testing and Authentication

In one embodiment, identity of a party is proven if 1) the tested party can distinguish false transaction hashes from true transaction hashes; 2) the tested party can order true transaction hashes; and 3) the tested party knows the secrets associated with each transaction. Then, given a set of received transaction hash values, unrecognized transaction hashes are removed from the set of transaction hash values. The remaining hash content hashes for each transaction contents $t_i$ are assembled into their specified order (i.e., the order in which they appear in a transaction log for transactions between the tested and testing party). The content hashes from the ordered list are concatenated, and a hash computed based on a specified hash type.

Figure 5:
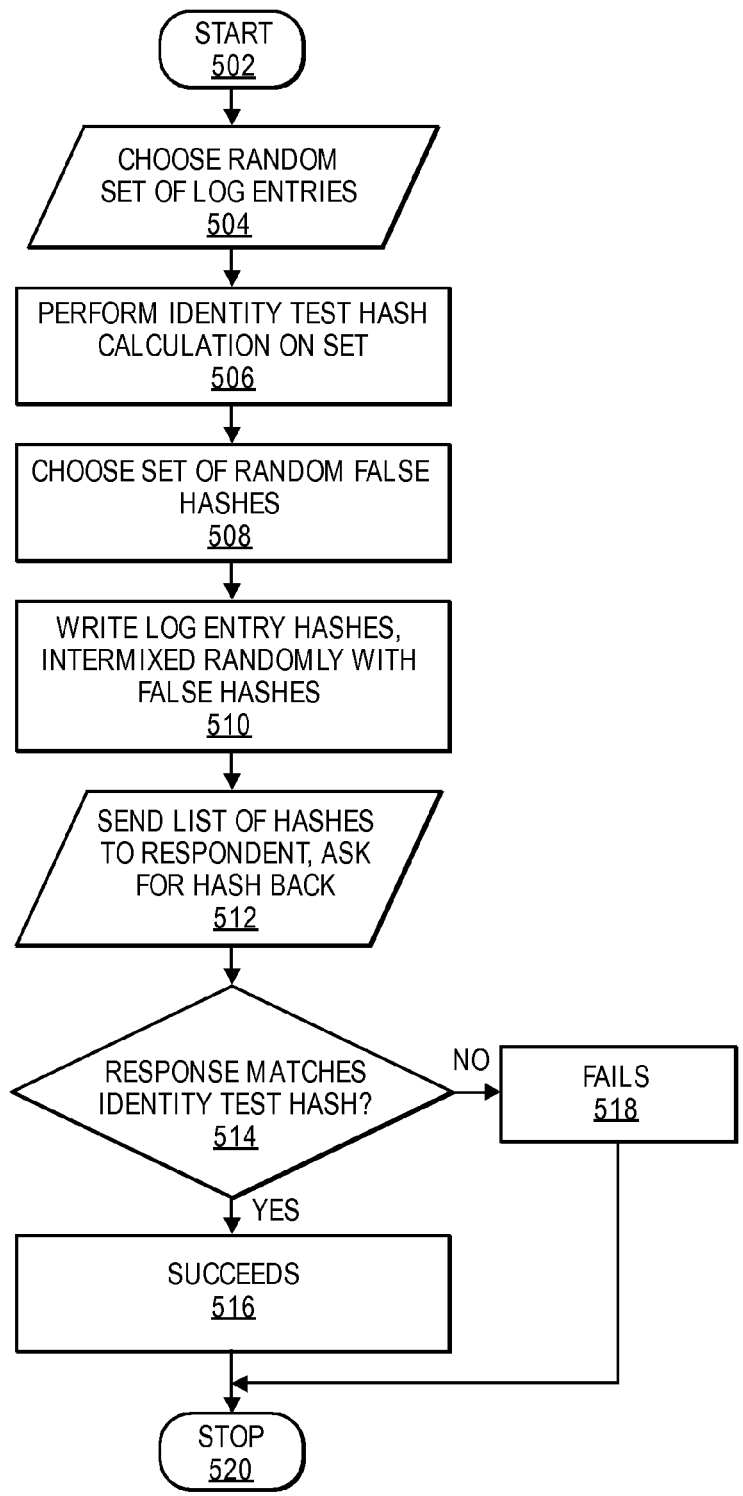
FIG. 5 is a flow diagram of one embodiment of a process for performing an identity test query.

FIG. 5 is a flow diagram of one embodiment of a process for performing an identity test query. The process is performed by processing logic that may comprise hardware (circuitry, dedicated logic, etc.), software (such as is run on a general purpose computer system or a dedicated machine), or a combination of both.

Referring to FIG. 5, the process begins at processing block 502. In one embodiment, processing logic chooses a random set of log entries from a transaction log (processing block 504). In one embodiment the transaction log is a historical record of transactions between a testing and a tested party, such as, for example, a bank and a customer, a media service and a portable media player device, etc.

Processing logic performs an identity test hash calculation on the set (processing block 506). As will be discussed in greater detail below, in one embodiment, an identity hash calculation involves concatenating multiple hash values together and computing a hash from the concatenated values. The result of the computation will be used to check another party's identity.

A set of random false hash values is then chosen by processing logic (processing block 508). Because there are different hashing techniques (i.e., MD5, SHA-1, SHA256, etc.), the false hash values are chosen to be consistent with the technique utilized to generate the actual hash values. The log entry hashes are written to a list intermixed randomly with the false hash values (processing block 510) and then sent to a respondent, tested party, etc. with a request for a reply hash value (processing block 512).

Processing logic receives a response from respondent and determines whether the response matches the identity test hash value (processing block 514). When processing logic determines that the response matches the identity test hash value, the identity test query succeeds (processing block 516), and the respondent has been identified. However, when processing logic determines that the response does not match the identity test hash value, the identity test query fails (processing block 518), and the respondent is not identified. The identity query process then ends at processing block 520.

Figure 6:
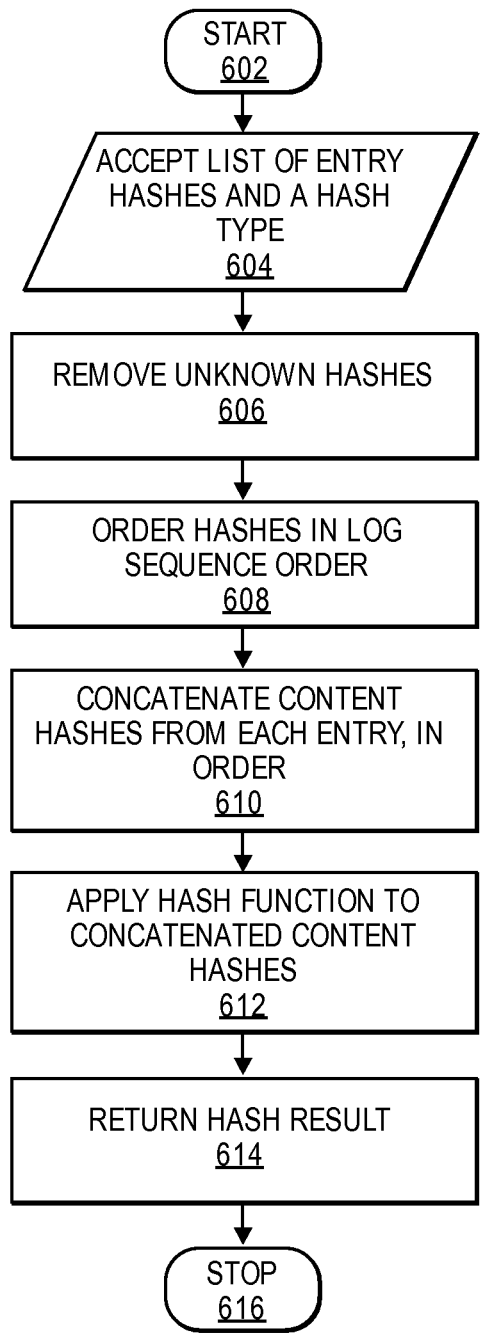
FIG. 6 is a flow diagram of one embodiment of a process for performing an identity test hash calculation.

FIG. 6 is a flow diagram of one embodiment of a process for performing an identity test hash calculation. The process is performed by processing logic that may comprise hardware (circuitry, dedicated logic, etc.), software (such as is run on a general purpose computer system or a dedicated machine), or a combination of both.

Referring to FIG. 6, the process begins at processing block 602. In one embodiment, processing logic accepts a list of entry hash values and a hash type from a testing party (processing block 604). In different embodiments the transaction log is a historical record of transactions between a testing and a tested party, such as a bank and a customer, a media service and a portable media player device, etc.

Processing logic removes unknown hash values from the list (processing block 606) and orders the remaining hash values in log sequence order (or another predetermined order) (processing block 608). In one embodiment, processing logic accesses a hash chained log of prior transactions between processing logic and the testing party. Because the transaction records in the accessed log are ordered and include hash values for each prior transaction entry between the parties, processing logic is able to utilize the prior transactions records in the log to both determine false hash values and order the actual hash values.

The contents of the ordered list of hash values, which were not removed as unknown hashes, are then concatenated in order (processing block 610). A hash function is then applied to the concatenated list of hash values (processing block 612). In one embodiment, processing logic utilizes the received hash type in order to compute the hash function of the concatenated hash values. Processing logic returns the result of the hash function (processing block 614) and the process ends at processing block 616.

Because hash values are exchanged in the identity test query, no content associated with log entries, user data, secret encryption keys, or other personal information is exchanged during the identification process. Furthermore, the nature of the hash values, being seemingly randomly distributed bit strings of anywhere from, for example, 128 bits to 512 bits or more, ensures that an outside attacker will virtually be guaranteed to fail at distinguishing false hash values from actual hash values corresponding to log record entries. In the extremely unlikely event that an attacker does distinguish false and actual hash values, the additional hurdle of organizing the actual hash values into a proper order is also required. Thus, the result is an identity test, as well as a identity test hash calculation, that are highly resistant to typical attack techniques.

Identity Assertion

In one embodiment, a party may assert its identity to another party by passing a set of transaction hashes, some of which are unknown, to the other party. In one embodiment, the sender also passes the hash type and hash value of the contents of all of the valid transaction hashes, in proper order. Because both parties have exchanged prior transactions, and are maintaining hash chained logs of the transaction history, the receiving party can authenticate the sending party as discussed below. Furthermore, the identity assertion does not involve the exchange or transmission of any personal information as part of the assertion.

Figure 7:
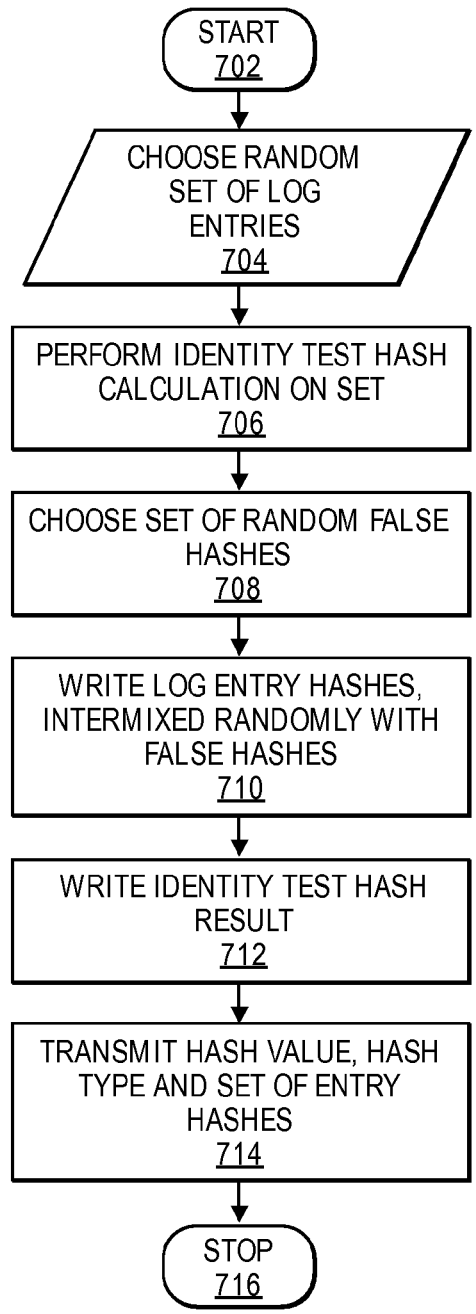
FIG. 7 is a flow diagram of one embodiment of a process for performing an identity assertion.

FIG. 7 is a flow diagram of one embodiment of a process for performing an identity assertion. The process is performed by processing logic that may comprise hardware (circuitry, dedicated logic, etc.), software (such as is run on a general purpose computer system or a dedicated machine), or a combination of both.

Referring to FIG. 7, the process begins at processing block 702. In one embodiment, processing logic chooses a random set of log entries from a transaction log (processing block 704). Processing logic performs an identity test hash calculation on the set (processing block 706), as discussed above with respect to FIG. 6.

A set of random false hashes is chosen by processing logic (processing block 708). Processing logic then writes a set of log entry hashes, where the false hashes are randomly intermixed with the actual transaction hashes (processing block 710). The identity test hash result is also written (processing block 712). Processing logic then transmits the hash result, hash type, and set of intermixed hashes to a receiving party (processing block 714). In one embodiment, processing logic asserts its identity via the transmission to the receiving party.

In one embodiment, because the receiving party maintains a transaction log, the receiving party will be able perform its own identity hash calculation, as discussed above with respect to FIG. 5, utilizing the received set of hash values and hash type. When the resulting hash value matches the value asserted by processing logic, processing logic's identity is successfully asserted to the receiving party via the transmitted hash result, hash type, and set of intermixed hashes to the receiving party.

Encryption Key Assertion

In one embodiment, transmitted data, communications, etc., may be secured even when transmission is over unsecure communications channels. In one embodiment, similar to the identity test discussed above where an appropriate hash value was returned to a sending party, the receiver utilizes the hash value as a session encryption key in order to encrypt further transmissions between the parties.

Figure 8A:
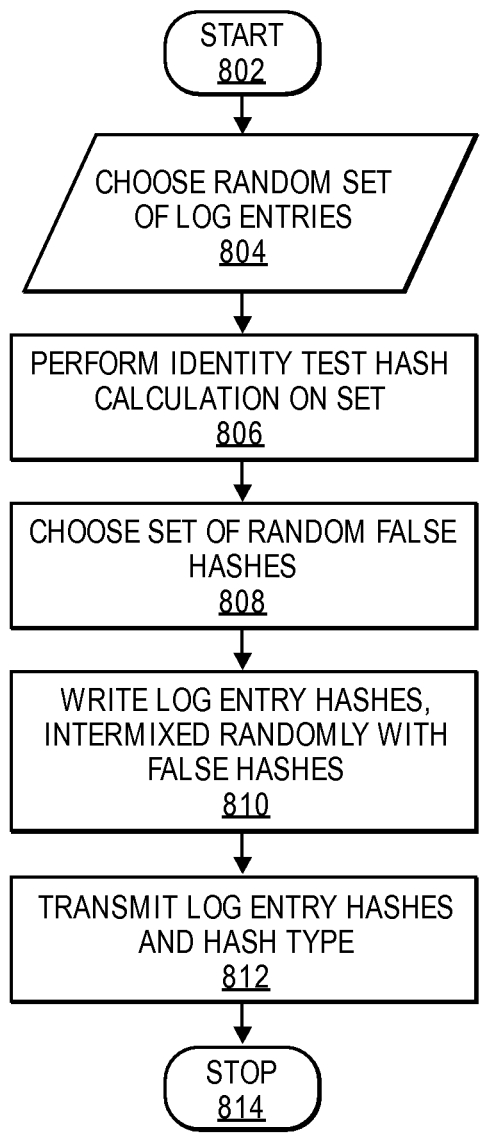
FIG. 8A is a flow diagram of one embodiment of a process for performing an encryption key assertion.

FIG. 8A is a flow diagram of one embodiment of a process for performing an encryption key assertion. The process is performed by processing logic that may comprise hardware (circuitry, dedicated logic, etc.), software (such as is run on a general purpose computer system or a dedicated machine), or a combination of both.

Referring to FIG. 8A, the process begins at processing block 802. In one embodiment, processing logic chooses a random set of log entries from a transaction log (processing block 804). Processing logic performs an identity test hash calculation on the set (processing block 806), as discussed above with respect to FIG. 6. A set of random false hashes is chosen by processing logic (processing block 808). Processing logic then writes a set of log entry hashes, where the false hashes are randomly intermixed with the actual transaction hashes (processing block 810).

The set of randomly intermixed hash values are then transmitted to a receiving party, along with a hash type (processing block 812), and the process ends at processing block 814.

In one embodiment, encryption key generation is similar to an identity assertion, except that with encryption key generation, the transmitting party does not include the identity test hash calculation value in the transmission to the receiving party. Rather, the receiving party is enabled, via the set of intermixed hash values, to determine the appropriate hash value and utilize that hash value as a session encryption key to encrypt data later transmitted to processing logic.

Figure 8B:
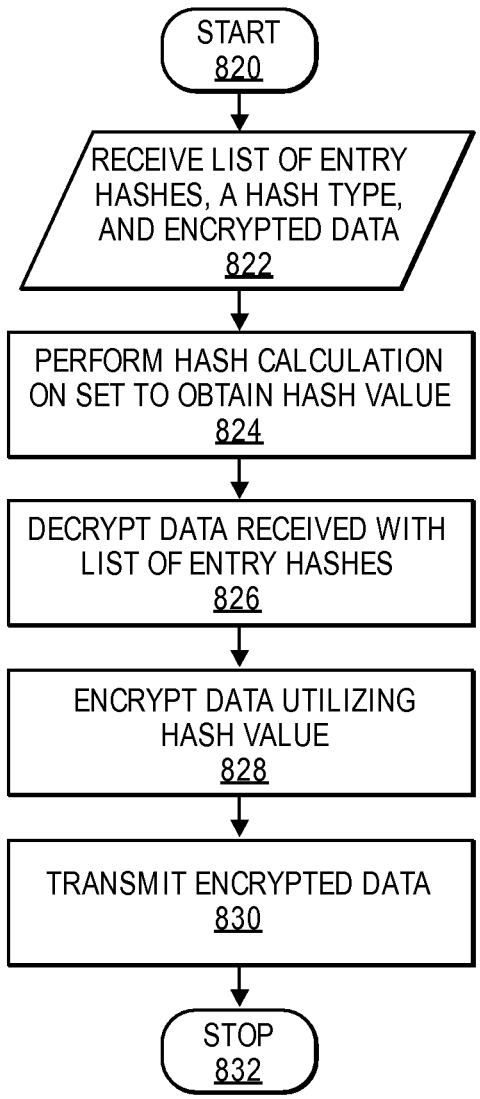
FIG. 8B is a flow diagram of one embodiment of a process for performing an encryption key generation.

FIG. 8B is a flow diagram of one embodiment of a process for performing an encryption key generation. The process is performed by processing logic that may comprise hardware (circuitry, dedicated logic, etc.), software (such as is run on a general purpose computer system or a dedicated machine), or a combination of both.

Referring to FIG. 8B, the process begins at processing block 820. In one embodiment, processing logic receives a list of entry hashes, a hash type, and encrypted data (processing block 822). In one embodiment, the accepted list of entry hashes is a list of actual hash values, which correspond to prior transactions between processing logic and another party, randomly intermixed with false hash values.

Processing logic utilizes the received hash type and the list of entry hashes to perform a hash calculation on the set (processing block 824). In one embodiment, the hash calculation performed by processing logic is similar to the process discussed above with respect to FIG. 6. In one embodiment, processing logic performs the hash calculation on the set to obtain a hash value.

The hash value is utilized, by processing logic, as a session encryption key to decrypt the data received with the list of entry hashes (processing block 826). Processing logic may further encrypt data utilizing the hash value and transmit the encrypted data to another other party (e.g., the party that transmitted the list of entry hashes to processing logic) (processing blocks 828 and 830). The process ends at processing block 832.

In the embodiments discussed above, session keys may be generated for each transmission, for use during a predetermined interval of time, etc. The evanescent nature of the session encryption keys ensures that attackers cannot hijack and misuse the encryption keys.

Transaction Writing

To write a transaction, in one embodiment, one party sends an identifier i to the other party along with a content set t. The sending party may assert its identity or encrypt transaction data, utilizing the techniques discussed above. In one embodiment, a receiving party may ask for an identity proof from the sending party, utilizing the techniques discussed above.

Once a transaction is written by the receiving party, that party returns the hash p of the record it has just written to its transaction log, to the sending party. This ensures that both the sending and receiving parties have the information needed for later identity tests, assertions, and encryption key generation.

In one embodiment, these transactions are kept secret from outside listeners in order to frustrate would be outside attackers, as discussed in greater detail below. In one embodiment, transactions are encrypted utilizing session encryption keys, which have been generated utilizing the above techniques. In one embodiment, the information needed to generate a session encryption key can be attached to the encrypted transaction data as a prefix or postscript, thereby allowing the communications channel to be untrusted as well as to enable a receiving party to create the session encryption key.

Transaction Log Initialization

The security of the techniques discussed herein, depend on having a collection of transactions from which to choose. Thus, in the early stages of interaction between any pair of entities, the system is vulnerable to replay attacks (discussed below). In order to manage this problem, as well as other attack methods, transaction logs are put through an "account creation" step. In one embodiment, transaction logs are seeded with a modest number of initial transactions before the parties are enabled to assert their identity, test an identity, or generate an encryption key. In one embodiment, the seed entries in the transaction logs are created using randomly chosen content bits, since the actual content of the initial transactions is unimportant to the process of identification.

Secondary Storage Repository

In one embodiment, it may be desirable to authenticate the identity of a device, such as a cellular telephone, portable media player, digital camera, personal digital assistant, or other limited purpose device. However, the device may not be able to store the complete transaction records of the parties. Furthermore, it might be undesirable to store such records solely in a portable device, since such devices are easily lost or stolen. Thus, in one embodiment, complete transaction records are maintained in a secondary repository so that the techniques discussed above may be utilized to identify the portable device.

Figure 9:
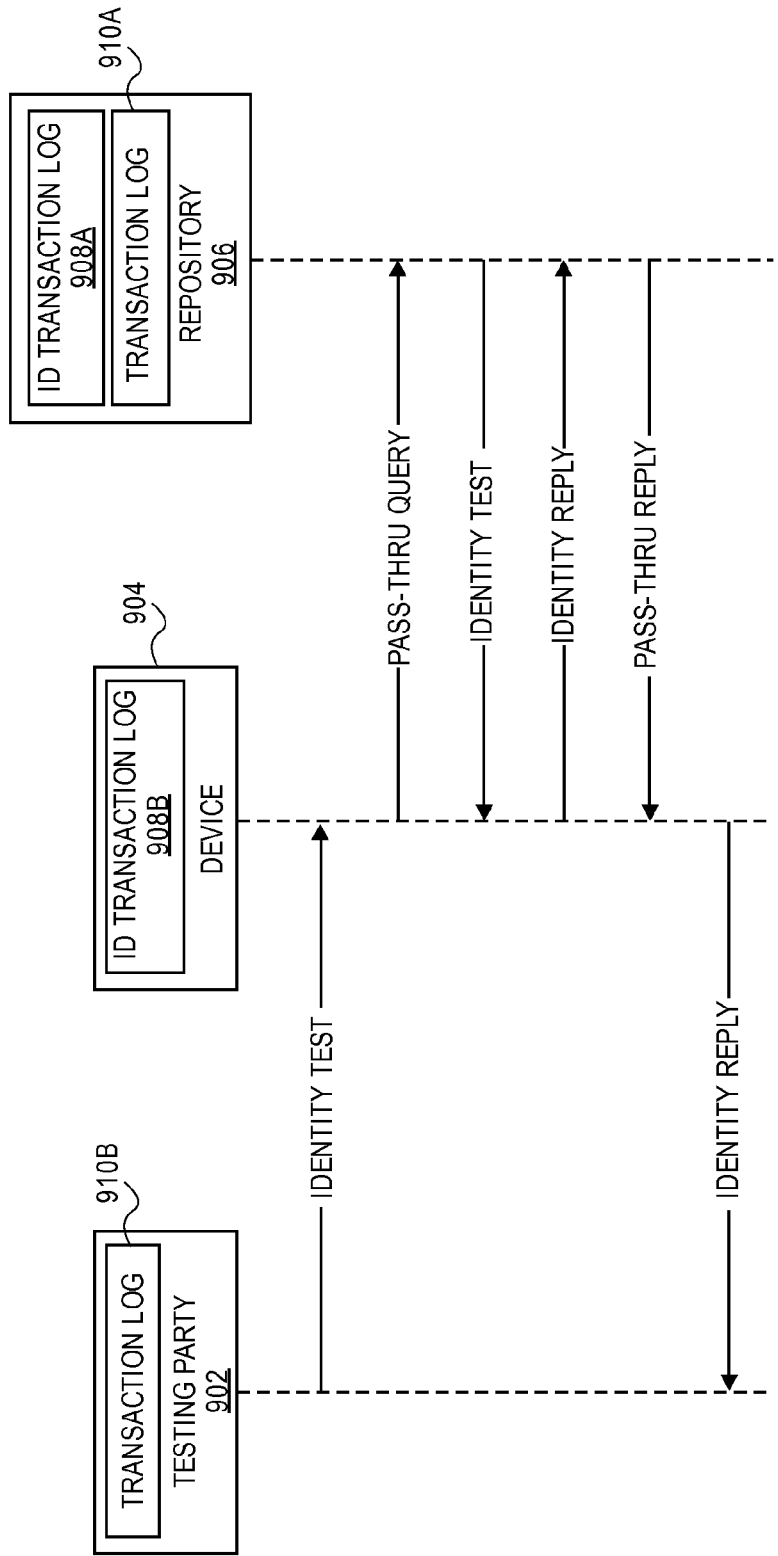
FIG. 9 illustrates one embodiment of system for maintaining a secondary storage repository.

FIG. 9 illustrates one embodiment of system for maintaining a secondary storage repository. In one embodiment, repository 906 contains the entire transaction log 910A of a party. In one embodiment, that party has a portable or limited purpose device, such as device 904. As discussed below, the party may query repository 906 for enough information to pass an identity test, obtain an identity assertion, or generate an encryption key during communication with testing party 902.

In one embodiment, device 904 and repository 906 are both parties to an identity transaction log, such as identity transaction logs 908A and 908B. Identity assertions, identity tests, and session encryption key generation may then be made between device 904 and repository 906, utilizing the techniques discussed above. In one embodiment, device 904 contains two identities, one for the device itself, and one for the party being represented by the device.

In one embodiment, repository 906 is "introduced" to the device, and identity transaction logs 908A and 908B are initialized, as discussed above. In one embodiment, repository 906 would then be enabled to accept queries from device 904 and produce the proper responses for an identity test or assertion for the party being represented by the device. Furthermore, repository 906 is able to produce th responses without revealing the contents t of the specified records or even which records are valid in transaction logs 910A or 910B. Rather, device 904 passes through transactions which it records to repository 906, thereby maintaining only a fraction of the available records cached on a storage of device 904.

In one embodiment, when device 904 receive an identity query, assertion, or generated encryption key, for a party associated with device 904, device 904 passes the query to repository 906. Repository tests the identity of device 904, utilizing the identity test techniques discussed above, in order to verify and authenticate device 904 prior to generating a reply to testing party's 902 initial identity test. When device 904 is property identified by repository 906, repository generates a response to the initial query of testing party 902 and passes the response to device 904. Device 904 may then respond to testing party's 902 query.

In one embodiment, it is not apparent to testing party 904 whether a particular device, such as device 904, constitutes the complete transaction repository or is just a caching device. In one embodiment, the device 904 may be a front end for an entire hierarchy of devices (not shown).

Anonymous and Specific Digital Signature

In one embodiment, an identity assertion can be used to produce a digital signature. The digital signature will be useful to a particular receiver. Furthermore, the digital signature does not necessarily reveal the identity of the signer. For example, a blog server might keep a set of transactions for a particular blog, based on previous postings. A person who can prove that they made several of the previous posts could thus be allowed to make further posts without revealing his or her identity in any way.

Security Against Attacks

In one embodiment, cryptographic hash function outputs may be presumed to be randomly distributed over the space of possible results. As a result, the techniques discussed above are resistant to a number of typical attack types used for malicious purposes.

One attack technique is the brute force attack. In order for an attacker to pass an identity check by brute force, the attacker must guess several independent large integers from a huge space, guess that other numbers are in fact invalid, and guess the correct order. While a successful brute force attack is theoretically possible, the odds of a successful brute force attack are extremely improbable.

Another attack technique is the dictionary attack. If an attacker were to listen to all transactions between a pair of parties, then the attacker could build a dictionary for later attacks, where the dictionary is effectively a parallel log. To the extent that the dictionary is incomplete, the order requirements of the techniques discussed above makes identity checks difficult to pass. Furthermore, for incomplete dictionaries, each break in the chain of hashes introduces an ordering uncertainty among the subchains that increases in difficulty with the permutations of the chain segments. For example, a transaction log with 1000 entries, where the identity test is ten items long, of which 4 might be invalid. A one percent loss of transaction data on such a log introduces an order ambiguity where roughly ten segments cannot be properly ordered. If it is assumed that valid entries all fall on separate segments, then order ambiguity alone makes it 150,000 times less likely that a dictionary attacker will successfully pass an identity test.

A final attack technique is the replay Attack. This method of attack is unlikely to succeed, because the chances of finding the same request a second time are extremely small in any log of sufficient size. Furthermore, the size of a log and test parameters can be controlled by the testing party as well as the receiving party. For example, for a small set of 1000 records, and an identity set size of ten with up to 4 items invalid, an attacker faces a wait of roughly a quintillion transactions before a replay opportunity arises. A likely and trivial attack is to make identity tests with a single transaction record hash, in order to discover information about the secrets associated with each transaction. This is easily defeated by setting an appropriate minimum identity test set size.

An Example of a Computer System

FIG. 10 is a block diagram of a computer system that may perform one or more of the operations described herein. Referring to FIG. 10, computer system 1000 may comprise an exemplary client or a server computer system. Computer system 1000 comprises a communication mechanism or bus 1011 for communicating information, and a processor 1012 coupled with bus 1011 for processing information. Processor 1012 includes a microprocessor, but is not limited to a microprocessor, such as, for example, Pentium™, etc.

System 1000 further comprises a random access memory (RAM), or other dynamic storage device 104 (referred to as main memory) coupled to bus 1011 for storing information and instructions to be executed by processor 1012. Main memory 1004 also may be used for storing temporary variables or other intermediate information during execution of instructions by processor 1012.

Computer system 1000 also comprises a read only memory (ROM) and/or other static storage device 1006 coupled to bus 1011 for storing static information and instructions for processor 1012, and a data storage device 1007, such as a magnetic disk or optical disk and its corresponding disk drive. Data storage device 1007 is coupled to bus 1011 for storing information and instructions.

Computer system 1000 may further be coupled to a display device 1021, such as a cathode ray tube (CRT) or liquid crystal display (LCD), coupled to bus 1011 for displaying information to a computer user. An alphanumeric input device 1022, including alphanumeric and other keys, may also be coupled to bus 1011 for communicating information and command selections to processor 1012. An additional user input device is cursor control 1023, such as a mouse, trackball, trackpad, stylus, or cursor direction keys, coupled to bus 1011 for communicating direction information and command selections to processor 1012, and for controlling cursor movement on display 1021.

Another device that may be coupled to bus 1011 is hard copy device 1024, which may be used for printing instructions, data, or other information on a medium such as paper, film, or similar types of media. Furthermore, a sound recording and playback device, such as a speaker and/or microphone may optionally be coupled to bus 1011 for audio interfacing with computer system 1000. Another device that may be coupled to bus 1011 is a wired/wireless communication capability 1025 to communication to a phone or handheld palm device.

Note that any or all of the components of system 1000 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A method comprising:
receiving, by a receiving system via a digital communication channel, a challenge that includes a set of hash values from a sending system, wherein the set includes actual hash values that correspond to log entries from a hash chained log, stored on the receiving system, that represents a plurality of transactions randomly intermixed with false hash values that do not correspond to log entries from the hash chained log, wherein the actual hash values that correspond to log entries from the hash chained log include less than all hash values in the hash chained log and at least two randomly selected hash values in the hash chained log;
extracting log entries from the hash chained log and determining, by using the extracted log entries, which hash values from the set of hash values correspond to the false hash values;
in response to determining which hash values from the set of hash values correspond to the false hash values, removing the false hash values from the set of hash values;
in response to removing the false hash values from the set of hash values, ordering the set of hash values into an ordered list based on an order of the log entries in the hash chained log;
concatenating the hash values in the ordered list;
producing a cryptographic hash value of the concatenated hash values from the ordered list; and
sending the produced cryptographic hash value to the sending system as an answer to the challenge.

2. The method of claim 1, further comprising:
encrypting data utilizing the produced cryptographic hash as a session encryption key; and
transmitting the encrypted data to the sending system.

3. The method of claim 1, further comprising:
receiving a cryptographic hash value along with the set of hash values from the sending system, the cryptographic hash value an identity assertion by the sending system; and
verifying the identity of the sending system by comparing the received cryptographic hash value with the produced cryptographic hash.

4. The method of claim 1, further comprising:
transmitting the set of hash values with results of a cryptographic hash as an identity assertion to the receiving system, wherein the set includes actual hash values that correspond to the extracted log entries from the hash chained log randomly intermixed with false hash values that do not correspond to the log entries from the hash chained log.

5. The method of claim 1, further comprising:
transmitting the set of hash values to the receiving system, wherein the set includes actual hash values that correspond to the extracted log entries from the hash chained log randomly intermixed with false hash values that do not correspond to the log entries from the hash chained log;
receiving the produced cryptographic hash value as a response from the receiving system; and
verifying the identity of the receiving system by using the produced cryptographic hash value.

6. The method of claim 1, further comprising:
utilizing results of the produced cryptographic hash as a session encryption key.

7. The method of claim 6, further comprising:
transmitting actual hash values that correspond to log entries from the hash chained log randomly intermixed with false hash values to the receiving system, to enable the receiving system to generate the session encryption key from the actual hash values corresponding to log entries from the hash chained log.

8. The method of claim 7, further comprising:
receiving encrypted data from the receiving system; and
decrypting the encrypted data utilizing the session encryption key.

9. The method of claim 1, further comprising:
exchanging a plurality of transactions between the sending system and the receiving system;
creating a hash-based log entry as a transaction record for each transaction from the plurality of transactions; and
maintaining a transaction log at the sending system and receiving system, the transaction log comprising an ordered log of transaction records.

10. The method of claim 9, further comprising:
initializing the transaction log maintained at the sending system and the receiving system with transaction records generated from randomly selected content data.

11. The method of claim 10, wherein the transaction record includes at least a hash of a previous transaction record, a unique identifier that identifies a system that originated the transaction for the current transaction record, and content data of the transaction.

12. The method of claim 1, further comprising:
receiving a query from a third party via an intermediate device, the query to authenticate the identity of the intermediate device to the third party;
verifying the identity of the intermediate device; and
transmitting the cryptographic hash, as a response to the query, to the third party via the intermediate device after the identity of the intermediate device has been verified.

13. The method of claim 12, wherein verifying the identity of the intermediate device further comprises:
transmitting a challenge to the intermediate device, the challenge including actual hash values that correspond to log entries from an ordered device identity transaction log maintained at the intermediate device, randomly intermixed with false hash values that do not correspond to log entries from the ordered device identity transaction log;
receiving an answer to the challenge from the intermediate device, the answer a cryptographic hash value; and
verifying the identity of the intermediate device from the answer.

14. A non-transitory computer readable medium storing instructions thereon which, when executed by a system, cause the system to perform a method comprising:
receiving, by a receiving system, a challenge that includes a set of hash values from a sending system, wherein the set includes actual hash values that correspond to log entries from a hash chained log, stored on the receiving system, that represents a plurality of transactions randomly intermixed with false hash values that do not correspond to log entries from the hash chained log, wherein the actual hash values that correspond to log entries from the hash chained log include less than all hash values in the hash chained log and at least two randomly selected hash values in the hash chained log;
extracting log entries from the hash chained log and determining, by using the extracted log entries, which hash values from the set of hash values correspond to the false hash values;
in response to determining which hash values from the set of hash values correspond to the false hash values, removing the false hash values from the set of hash values;
in response to removing the false hash values from the set of hash values, ordering the set of hash values into an ordered list based on an order of the log entries in the hash chained log;
concatenating the hash values in the ordered list;
producing a cryptographic hash value of the concatenated hash values from the ordered list; and
sending the produced cryptographic hash value to the sending system as an answer to the challenge.

15. The computer readable medium of claim 14, further comprising:
encrypting data utilizing the produced cryptographic hash as a session encryption key; and
transmitting the encrypted data to the sending system.

16. The computer readable medium of claim 14, further comprising:
receiving a cryptographic hash value along with the set of hash values from the sending system, the cryptographic hash value an identity assertion by the sending system; and
verifying the identity of the sending system by comparing the received cryptographic hash value with the produced cryptographic hash.

17. The computer readable medium of claim 14, further comprising:
transmitting the set of hash values with results of a cryptographic hash as an identity assertion to the receiving system, wherein the set includes actual hash values that correspond to the extracted log entries from the hash chained log randomly intermixed with false hash values that do not correspond to the log entries from the hash chained log.

18. The computer readable medium of claim 14, further comprising:
transmitting the set of hash values to the receiving system, wherein the set includes actual hash values that correspond to the extracted log entries from the hash chained log randomly intermixed with false hash values that do not correspond to the log entries from the hash chained log;
receiving the produced cryptographic hash value as a response from the receiving system; and
verifying the identity of the receiving system by using the produced cryptographic hash value.

19. The computer readable medium of claim 14, further comprising:
utilizing results of the produced cryptographic hash as a session encryption key.

20. The computer readable medium of claim 19, further comprising:
transmitting actual hash values that correspond to log entries from the hash chained log randomly intermixed with false hash values to the receiving system, to enable the receiving system to generate the session encryption key from the actual hash values corresponding to log entries from the hash chained log.

21. The computer readable medium of claim 20, further comprising:
receiving encrypted data from the receiving system; and
decrypting the encrypted data utilizing the session encryption key.

22. The computer readable medium of claim 14, further comprising:
receiving a query from a third party via an intermediate device, the query to authenticate the identity of the intermediate device to the third party;
verifying the identity of the intermediate device; and transmitting the cryptographic hash, as a response to the query, to the third party via the intermediate device after the identity of the intermediate device has been verified.

23. The computer readable medium of claim 22, wherein verifying the identity of the intermediate device further comprises:
transmitting a challenge to the intermediate device, the challenge including actual hash values that correspond to log entries from an ordered device identity transaction log maintained at the intermediate device, randomly intermixed with false hash values that do not correspond to log entries from the ordered device identity transaction log;
receiving an answer to the challenge from the intermediate device, the answer a cryptographic hash value; and
verifying the identity of the intermediate device from the answer.

24. A system, comprising:
a memory; and
a processor coupled with the memory to:
receive a challenge that includes a set of hash values from a sending system, wherein the set includes actual hash values that correspond to log entries from a hash chained log, stored on the system, that represents a plurality of transactions randomly intermixed with false hash values that do not correspond to log entries from the hash chained log, wherein the actual hash values that correspond to log entries from the hash chained log include less than all hash values in the hash chained log and at least two randomly selected hash values in the hash chained log,
extract log entries from the hash chained log and determine, by using the extracted log entries, which hash values from the set of hash values correspond to the false hash values,
in response to determining which hash values from the set of hash values correspond to the false hash values, remove the false hash values from the set of hash values,
in response to removing the false hash values from the set of hash values, order the set of hash values into an ordered list based on an order of the log entries in the hash chained log,
concatenate the hash values in the ordered list,
produce a cryptographic hash value of the concatenated hash values from the ordered list, and
send the produced cryptographic hash to the sending system as an answer to the challenge.

* * * * *